(12) United States Patent
Viard et al.

(10) Patent No.: US 10,209,380 B2
(45) Date of Patent: Feb. 19, 2019

(54) METHODS AND SYSTEMS FOR JUXTAPOSITION ACROSS GEOLOGICAL DISCONTINUITIES

(71) Applicant: SCHLUMBERGER TECHNOLOGY CORPORATION, Sugar Land, TX (US)

(72) Inventors: Thomas Lucas Viard, Montpellier (FR); Azeddine Benabbou, Montpellier (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 114 days.

(21) Appl. No.: 15/395,936

(22) Filed: Dec. 30, 2016

(65) Prior Publication Data

US 2018/0188397 A1    Jul. 5, 2018

(51) Int. Cl.
*G01V 1/30* (2006.01)

(52) U.S. Cl.
CPC ............... *G01V 1/301* (2013.01); *G01V 1/30* (2013.01); *G01V 2210/60* (2013.01); *G01V 2210/644* (2013.01)

(58) Field of Classification Search
CPC . G01V 1/28; G01V 1/30; G01V 1/301; G01V 2210/60; G01V 2210/644
USPC ........................................ 367/38; 702/14, 16
See application file for complete search history.

(56) References Cited

U.S. PATENT DOCUMENTS

| | | | |
|---|---|---|---|
| 6,388,947 B1* | 5/2002 | Washbourne | G01V 1/42 367/38 |
| 8,965,745 B2 | 2/2015 | Lepage | |
| 2004/0193960 A1* | 9/2004 | Vassilev | G01V 1/301 714/38.1 |
| 2014/0136171 A1 | 5/2014 | Sword, Jr. | |

OTHER PUBLICATIONS

Aavatsmark, et al., "Discretization on unstructured grids for inhomogeneous, anisotropic media. Part I: Derivation of the methods," SIAM Journal on Scientific Computing, 1998, vol. 19, No. 5, pp. 1700-1716.
Allan, "Model for hydrocarbon migration and entrapment within faulted structures," AAPG bulletin, 1989, vol. 73, No. 7, pp. 803-811.
Manzocchi, et al., "Fault transmissibility multipliers for flow simulation models," Petroleum Geoscience, 1999, vol. 5, No. 1, pp. 53-63.

(Continued)

*Primary Examiner* — Ian J Lobo
(74) *Attorney, Agent, or Firm* — Jamie A. Castano (57) ABSTRACT

A method is described in which a seismic data set of a geological survey is provided. A geological discontinuity in the seismic data set is identified. A first parameterization of at least a portion of a first side of the geological discontinuity is identified. A second parameterization of at least a portion of a second side of the geological discontinuity is identified. A plurality of isolines of properties of the first and second parameterizations is determined. A surface of the geological discontinuity is divided according to the isolines. The divided surfaces of the geological discontinuity are mapped.

20 Claims, 10 Drawing Sheets

(56) References Cited

OTHER PUBLICATIONS

Manzocchi, et al., "Numerical and geological advances in fault handling for production flow simulation," AAPG Hedberg conference on "Evaluating the Hydrocarbon Sealing Potential of Faults and Caprocks", Dec. 2-5, 2002, Barossa Valley, South Australia.

Gunasekera, et al., "A multi-point flux discretization scheme for general polyhedral grids," SPE International Oil and Gas Conference and Exhibition in China. Society of Petroleum Engineers, 1998.

Knipe, "Juxtaposition and seal diagrams to help analyze fault seals in hydrocarbon reservoirs," AAPG bulletin, 1997, vol. 81, No. 2, pp. 187-195.

Mallison, et al., "Unstructured cut-cell grids for modeling complex reservoirs," SPE Reservoir Simulation Symposium. Society of Petroleum Engineers, 2013.

Mallison, et al., "Unstructured cut-cell grids for modeling complex reservoirs," SPE Journal, 2014, vol. 19, No. 02, pp. 340-352.

\* cited by examiner

METHODS AND SYSTEMS FOR JUXTAPOSITION ACROSS GEOLOGICAL DISCONTINUITIES

BACKGROUND

The economic recovery of natural resources such as oil is extremely difficult. Prediction of the flow in a reservoir is important in determining a production plan. Accurately predicting the flow in a reservoir for the production plan can make the difference between a successful well and an uneconomical well.

Seismic surveys may be used to collect rock and soil information that may in turn be used to locate faults and estimate fluid flow in the substrata. When different types of substrata meet (for example, at a discontinuity), determining the behavior of fluids across the boundary is problematic. Known approaches are either costly and difficult to implement or inaccurately approximate a fault geometry. In such prior techniques, estimations or assumptions may be used to fix the data such that a calculation can be completed. However, this introduces numerical errors up to and including inadvertent modelling of non-physical behaviors. In a grid based approach to modelling the substrata, a discontinuity in the substrata typically leads to a discontinuity in the grid, which makes computing the flow across the discontinuity extremely difficult.

Accordingly, methods and systems for accurate analysis, such as flow simulation, across discontinuities is desirable.

BRIEF SUMMARY

In an exemplary embodiment of a method according to the present disclosure, a seismic data set of a geological survey is provided. A geological discontinuity in the seismic data set is identified. A first parameterization of at least a portion of a first side of the geological discontinuity is identified. A second parameterization of at least a portion of a second side of the geological discontinuity is identified. A plurality of isolines of parameterization properties of the first and second parameterizations is determined. A surface of the geological discontinuity is divided according to the isolines. The divided surfaces of the geological discontinuity are mapped.

In another exemplary embodiment, geophysics processor includes: a receiving portion configured to receive a data set of a geological survey; an identification portion configured to: identify a geological discontinuity in the seismic data set, identify a first parameterization of at least a portion of a first side of the geological discontinuity, and identify a second parameterization of at least a portion of a second side of the geological discontinuity; and a processing circuit configured to: determine a plurality of isolines of parameterization properties of the first and second parameterizations, divide a surface of the geological discontinuity according to the isolines, and map the divided surfaces of the geological discontinuity.

BRIEF DESCRIPTION OF THE DRAWINGS

For a better understanding of the aforementioned embodiments as well as additional embodiments thereof, reference should be made to the Detailed Description below, in conjunction with the following drawings in which like reference numerals refer to corresponding parts throughout the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc., may be used herein to describe various elements, these elements should not be limited by these terms. These terms are used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the invention herein is for the purpose of describing particular embodiments and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combination of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context.

Those with skill in the art will appreciate that while some terms in this disclosure may refer to absolutes, e.g., all of the components of a wavefield, all source receiver traces, each of a plurality of objects, etc., the methods and techniques disclosed herein may also be performed on fewer than all of a given thing, e.g., performed on one or more components and/or performed on one or more source receiver traces. Accordingly, in instances in the disclosure where an absolute is used, the disclosure may also be interpreted to be referring to a subset.

The computing systems, methods, processing procedures, techniques and workflows disclosed herein are more efficient and/or effective methods for identifying, isolating, transforming, and/or processing various aspects of data that is collected from a subsurface region or other multi-dimensional space to enhance flow simulation prediction accuracy. The described methods and apparatus provide a new technological solution to the petroleum engineering problems described herein. Embodiments are directed to new and specialized processing apparatus and methods of using the same. Flow simulation prediction according to the present application implicate a new processing approach (e.g., hardware, special purpose processors, specially programmed general purpose processors) because such analyses are too complex and cannot be done by a person in the time available or at all. Thus, the apparatus and method of the claims are directed to tangible implementations or solutions to a specific technological problem in the seismic field.

Figure 1A:
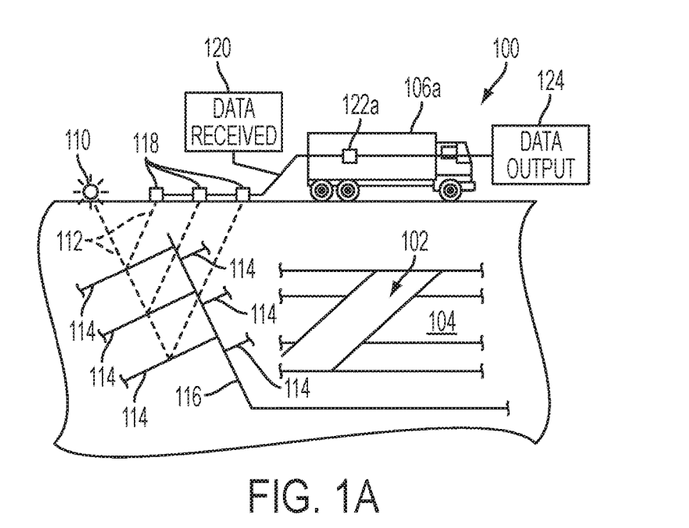
FIG. 1A illustrates a simplified schematic view of a survey operation performed by a survey tool at an oil field.
Figure 1B:
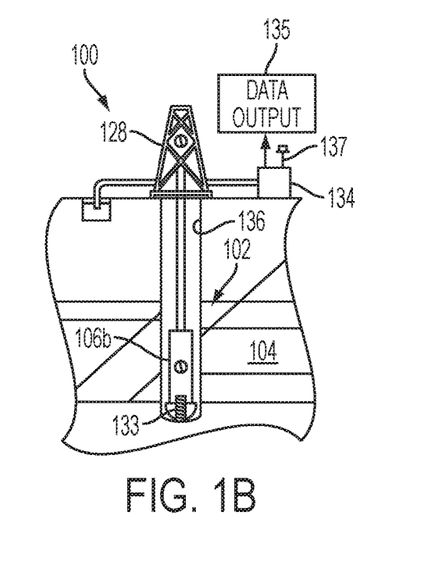
FIG. 1B illustrates a simplified schematic view of a drilling operation performed by drilling tools.
Figure 1C:
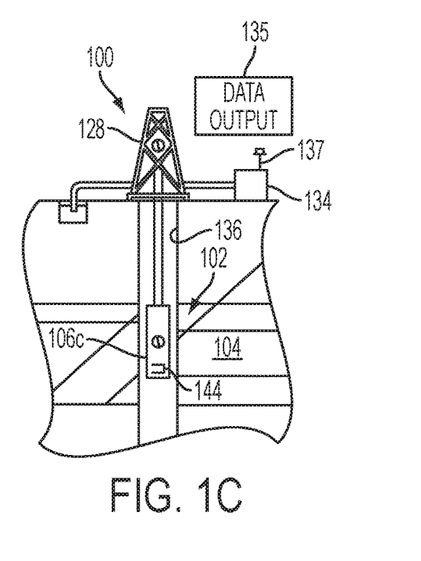
FIG. 1C illustrates a simplified schematic view of a production operation performed by a production tool.

FIGS. 1A-1C illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122a of the seismic truck 106a, and responsive to the input data, computer 122a generates seismic data output 124. This seismic data output may be stored, transmitted or further processed as desired, for example, by data reduction.

FIG. 1B illustrates a drilling operation being performed by drilling tools 106b suspended by rig 128 and advanced into subterranean formations 102 to form wellbore 136. The drilling tools are advanced into subterranean formations 102 to reach reservoir 104. Each well may target one or more reservoirs. The drilling tools may be adapted for measuring downhole properties using logging while drilling tools. The logging while drilling tools may also be adapted for taking core sample 133 as shown.

The drilling tool 106b may include downhole sensor S adapted to perform logging while drilling (LWD) data collection. The sensor S may be any type of sensor.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106b may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

The data gathered by sensors (S) may be collected by surface unit 134 and/or other data collection sources for analysis or other processing. An example of the further processing is the generation of a grid for use in the computation of a juxtaposition diagram as discussed below. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller.

FIG. 1C illustrates a production operation being performed by production tool 106D deployed from a production unit or Christmas tree 129 and into completed wellbore 136 for drawing fluid from the downhole reservoirs into surface facilities 142. The fluid flows from reservoir 104 through perforations in the casing (not shown) and into production tool 106*d* in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106*d* or associated equipment, such as Christmas tree 129, gathering network 146, surface facility 142, and/or the production facility.

While FIGS. 1B-1C illustrate tools used to measure properties of an oilfield, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

Figure 2:
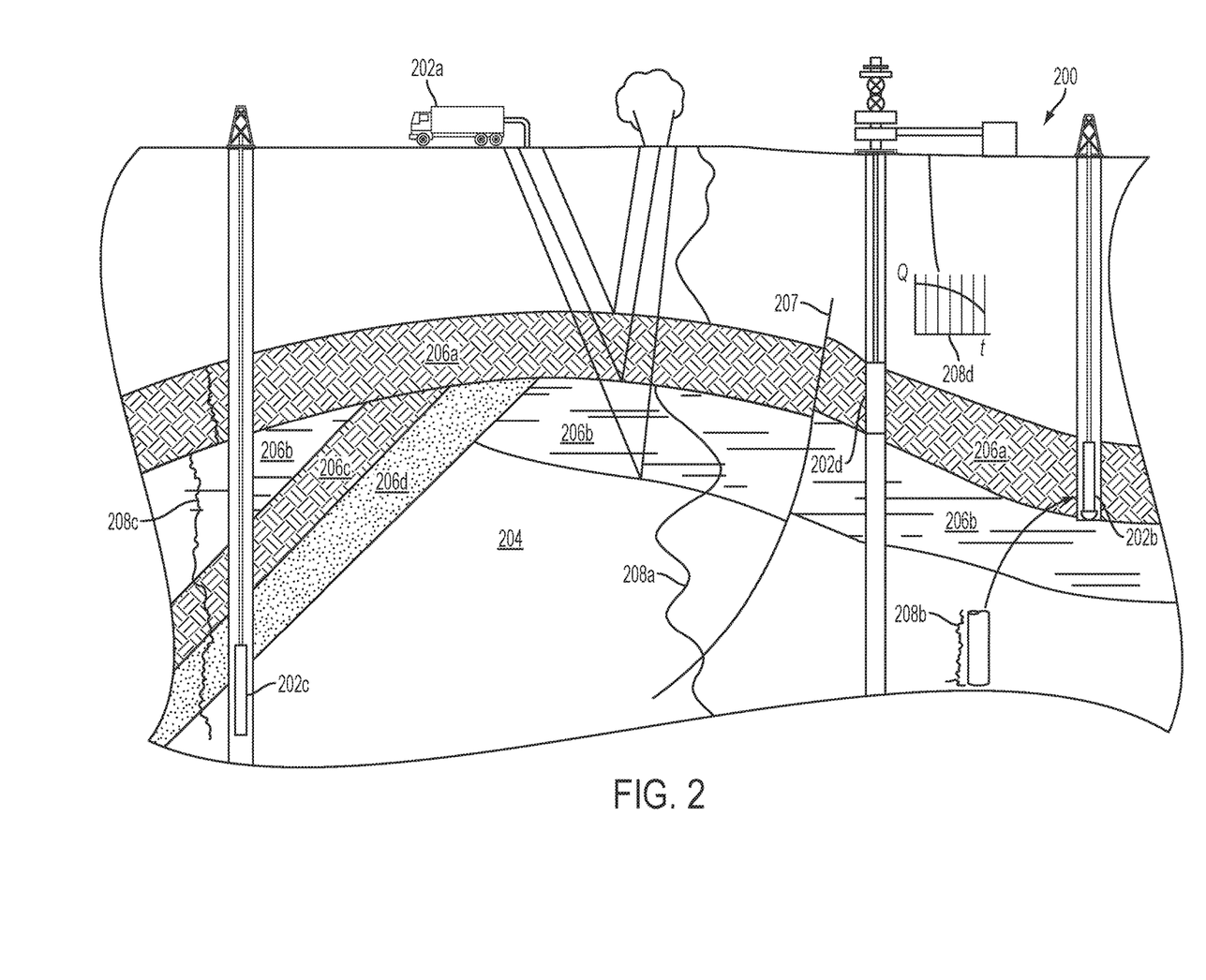
FIG. 2 illustrates a schematic view, partially in cross section, of an oilfield.

The field configurations of FIGS. 1A-1C are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites. An example of processing of data collected by the sensors is the generation of a grid for use in the computation of a juxtaposition diagram as discussed below FIG. 2 illustrates a schematic view, partially in cross section of oilfield 200 having data acquisition tools 202*a*, 202*b*, 202*c* and 202*d* positioned at various locations along oilfield 200 for collecting data of subterranean formation 204 in accordance with implementations of various technologies and techniques described herein. Data acquisition tools 202*a*-202*d* may be the same as data acquisition tools 106*a*-106*d* of FIGS. 1A-1C, respectively, or others not depicted. As shown, data acquisition tools 202*a*-202*d* generate data plots or measurements 208*a*-208*d*, respectively. These data plots are depicted along oilfield 200 to demonstrate the data generated by the various operations.

Data plots 208*a*-208*c* are examples of static data plots that may be generated by data acquisition tools 202*a*-202*c*, respectively; however, it should be understood that data plots 208*a*-208*c* may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208*a* is a seismic two-way response over a period of time. Static plot 208*b* is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208*c* is a logging trace that provides a resistivity or other measurement of the formation at various depths.

A production decline curve or graph 208*d* is a dynamic data plot of the fluid flow rate over time. The production decline curve provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206*a*-206*d*. As shown, this structure has several formations or layers, including a shale layer 206*a*, a carbonate layer 206*b*, a shale layer 206*c* and a sand layer 206*d*. A fault 207 extends through the shale layer 206*a* and the carbonate layer 206*b*. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, for example below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Seismic data displayed in static data plot 208*a* from data acquisition tool 202*a* may be used by a geophysicist to determine characteristics of the subterranean formations and features. The core data shown in static plot 208*b* and/or log data from well log 208*c* may be used by a geologist to determine various characteristics of the subterranean formation. The production data from graph 208*d* may be used by the reservoir engineer to determine fluid flow reservoir characteristics. The data analyzed by the geologist, geophysicist and the reservoir engineer may be analyzed using modeling techniques.

Figure 3:
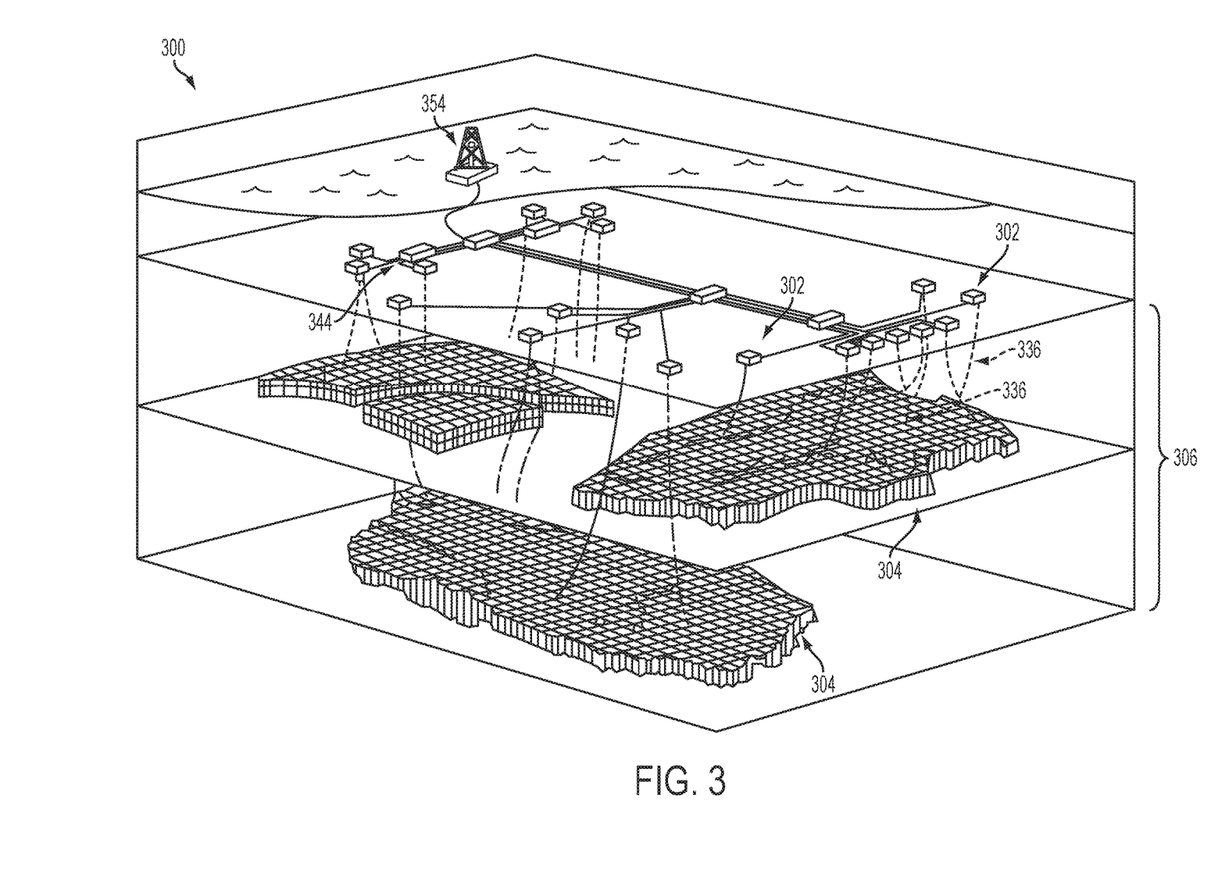
FIG. 3 illustrates a perspective view of an oilfield.

FIG. 3 illustrates an oilfield 300 at which production operations in accordance with implementations of various technologies and techniques described herein may be performed. The oilfield 300 has a plurality of wellsites 302 operatively connected to central processing facility 354. The oilfield configuration of FIG. 3 does not limit the scope of the oilfield application system. The oilfield, or parts thereof, may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores 336 extend through subterranean formations 306 including reservoirs 304. These reservoirs 304 contain fluids, such as hydrocarbons. The wellsites 302 draw fluid from the reservoirs 304 and pass them to the processing facility 354 via surface networks 344. The surface networks 344 have tubing and control mechanisms that control the flow of fluids from the wellsites 302 to the processing facility 354.

Attention is now directed to methods, techniques, and workflows for processing and/or transforming collected data that are in accordance with some embodiments. Some operations in the processing procedures, methods, techniques, and workflows disclosed herein may be combined and/or the order of some operations may be changed. Those with skill in the art will recognize that in the geosciences and/or other multi-dimensional data processing disciplines, various interpretations, sets of assumptions, and/or domain models such as drilling plan models, may be refined in an iterative fashion; this concept is applicable to the procedures, methods, techniques, and workflows as discussed herein. This iterative refinement can include use of feedback loops executed on an algorithmic basis, such as at a computing device (e.g., computing system 1100, FIG. 10), and/or through manual control by a user who may make determinations regarding whether a given action, template, or model has become sufficiently accurate. In an embodiment, a graphics processing unit is used to carry the below described process. Graphics processing units are specialized hardware that are designed to carry out calculations on information represented as polygons. Thus, the graphics processing unit is well-suited to provide an efficient and high speed geophysics processor.

In an example, a grid is provided with polygons representing different types of stratigraphy of the substrata. It will be appreciated that a polyhedral grid containing polyhedral may be used to represent 3D elements. Such polyhedral may be bounded by a closed set of polygons.

A simplified analogy is a playbox filled with colored sand arranged in layers. The different colors of sand may represent different types of material (e.g., shale, sand, rock) in the stratigraphy. The permeability of layers, which is of interest for determining the flow of fluids such as oil, is dependent on the type of material. If there is a discontinuity, for example a vertical shift in the substrata, the colors of sand may not match up. Thus, to determine the flow of the fluid through the discontinuity, the amount of one type of material (color of sand) disposed adjacent with other types of material (other colors of sand) is determined to estimate the flow of fluid through the discontinuity. Thus, each side of the discontinuity may be modeled as a series of polygons and it is meaningful to determine the connection between the polygons of each side of the discontinuity.

Figure 4A:
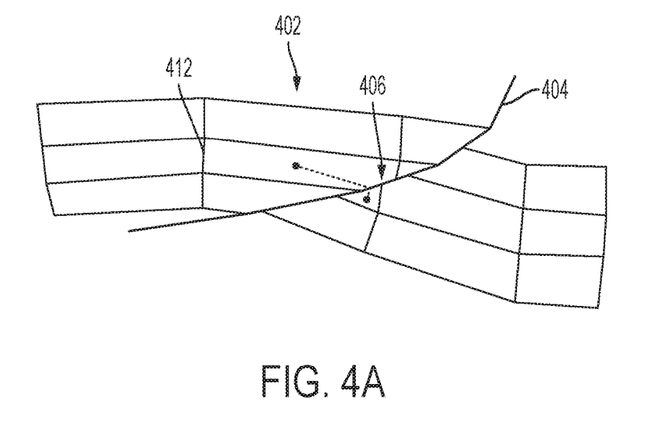
FIG. 4A illustrates an exemplary juxtaposition diagram in 2D.
Figure 4B:
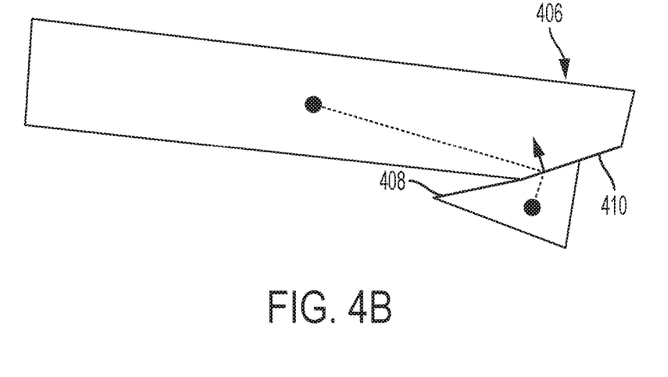
FIG. 4B illustrates an enlarged portion of the exemplary juxtaposition diagram in 2D of FIG. 4A.

FIGS. 4A and 4B illustrate an exemplary juxtaposition diagram. In particular, a 2D sketch of a non K-orthogonal cell-to-cell connection across a fault is illustrated. The grid 402 is cut by the fault 404 with one cell-to-cell connection 406 represented. The orientation of face 410 is significantly different from the cell-to-face orientation (e.g., 412). This connection 406 is shown having a highly non-orthogonal nature. Other faces, such as face 408, may be not common to the cells illustrated in FIG. 4, and its orientation may be disregarded with respect to the connectivity between those cells. Juxtaposition diagrams may be used to analyze fault seals and to compute connectivity across an unconformity (fault, erosion, base and discontinuity), which may also be referred to as non-neighbor connectivity (NNC). NNC information is important to enable accurate flow simulation in reservoir models.

One approach to compute NNCs is to project the faces of both sides of a surface onto each other. This projection approach may be used in two-point flux approximation (TPFA) schemes; however TPFA is known to introduce numerical errors in the presence of non K-orthogonal interfaces such as those shown in FIG. 4, which are frequent around unconformities—especially when using unstructured simulation grids.

A more advanced scheme such as multiple-point flux approximation (MPFA) may be used address these numerical errors, but simple projection of faces of both sides of a discontinuity onto each other is insufficient to meet the requirement for the calculation. An MPFA implementation relies on the detection of all the faces around a node to gather the so-called interaction region, which a trivial face-by-face geometrical projection does not easily permit. The issue may be mitigated by welding the grid at unconformities, but this approach is computationally intensive and challenging to implement.

In an embodiment, a previously-computed UVW parameterization on the positive and negative sides of a geological discontinuity (e.g., fault, erosion, base, etc.) is used in order to generate a MPFA-compatible diagram of juxtaposition. A flow simulation-compatible diagram (e.g., an MPFA-compatible diagram) includes diagrams in which the dot product of the normal vector at the middle of an edge and the vector from the center of a cell to the middle of the edge is not-negative for all edges of the cell. A UVW parameterization refers to a parameterization of a subsurface data volume. The subsurface data volume may be provided by a seismic data volume that may also be processed to match well measurements, user expectations, etc. In areas where seismic data is not available or unreliable, there extrapolated well data may also be used to generate this parameterization. Preferably, W represents a depth or layer of the stratigraphy and U and V represent a coordinate system on that stratigraphy. The W parameter may follow the stratigraphy and is not required to represent a flat plane.

In an embodiment, a workflow obtains a UVW+ and UVW− parameterization on both sides of an unconformity. This information is used to divide the unconformity surface along some specific isolines of the UVW+/− parameterization properties, which produces a set of faces that can be mapped to the juxtaposition diagram.

One exemplary advantage of this approach is that it may be more accurate for a TPFA scheme since it is less prone to the artifacts of the face-to-face projection approach, e.g., undesirable sliver NNC connections that may appear due to projection errors. It may also be more efficient for a TPFA scheme since there is no need to waste computer time searching for which faces should be projected on one another. Another exemplary advantage of this approach is that face-neighborhood topological information may be maintained during the process, which enables the use of MPFA schemes.

Figure 5:
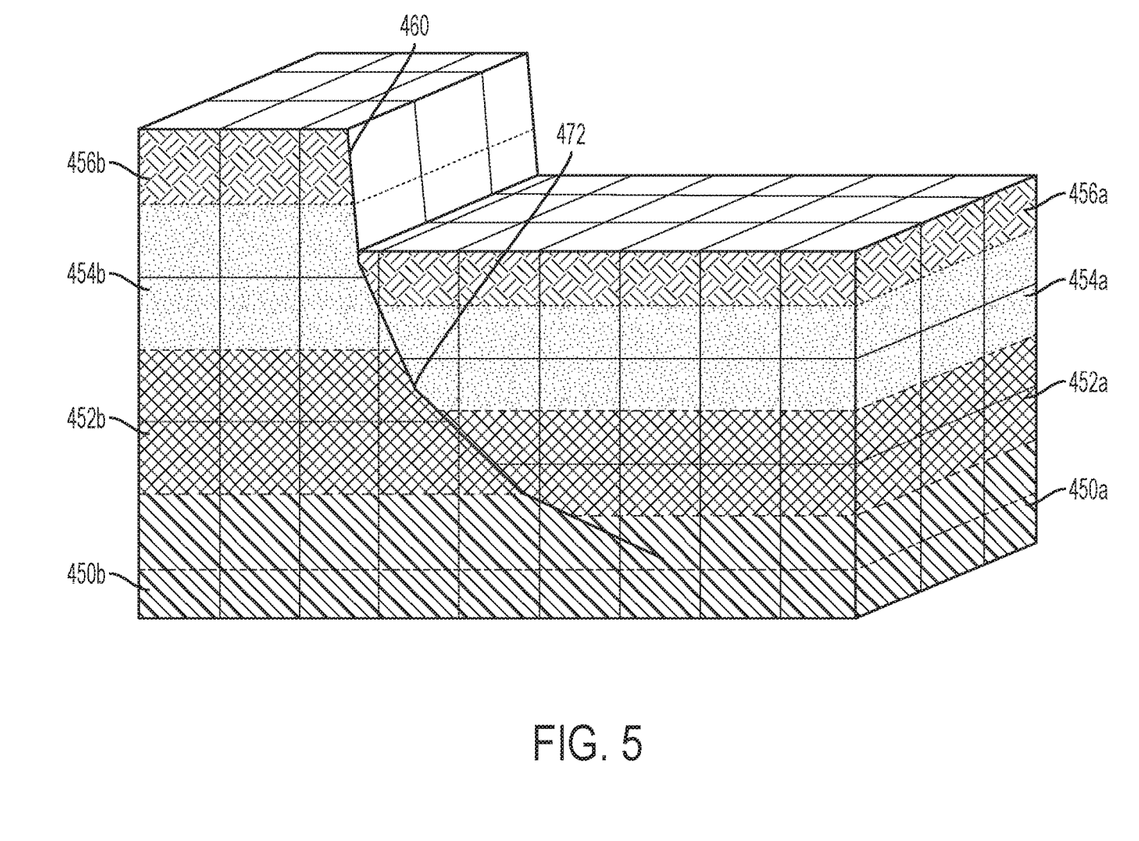
FIG. 5 illustrates an exemplary grid generated from a geochronological model.

FIG. 5 illustrates and unstructured grid generated from a geochronological models. It will be appreciated that the grid illustrates in FIG. 5 is exemplary and the disclosed techniques are applicable to any kind of grid with unconformities and whose cell boundaries can be represented as isolines of a set of implicit functions. Such grids include, but are not restricted to depositional grids and cut-cell grids.

The layers 450, 452, 454 and 456 illustrate the W parameterization property. Of course, the layers are not necessarily discrete and each layer may further include a gradation in the substrata. Thus, the layers may represent regions of different material (e.g., sand, shale, etc.) as well as gradients thereof or any other property that affects the flow characteristics of the material. Thus, the W parameter is illustrated approximately vertically on the page. The layers of the grid may provide the isovalues in the W direction. The U and V parameters may be approximately horizontally and into the page noting that the UV parameterization need not fit to a flat plane and therefore may have some variation depending on the contour of the W parameterization. The U and V cell boundaries may be generated as a subset of isovalues of the U and V parameterization properties.

A discontinuity 460, which may be a fault running through the stratigraphy, may separate a first side (e.g., 450*a*, 452*a*, 454*a*, 456*a*), which may be referred to as a UVW+ side, and a second side (e.g., 450*b*, 452*b*, 454*b*, 456*b*), which may be referred to as a UVW− side.

The unconformity may initially be provided as a polygonal surface. In some cases, the unconformity may be explicitly represented in the supporting grid as two topological sides, referred to as the plus and minus side, that loosely or exactly face each other. The UVW parameterization may be computed on the supporting grid or supplied as a result of a previous calculation, via interpolation using known stratigraphic layers and specific constraints, or via a more thorough restoration-based approach.

The plus and minus sides may be topologically disjoint, while UVW+ and UVW− parameterizations would preferably be on a single topological entity. Therefore to the UVW properties from each side of the unconformity may be transferred to a common surface, which may be the initial polygonal surface. Note that the resolution of the initial polygonal surface may differ from the resolution of the two sides.

Figure 6:
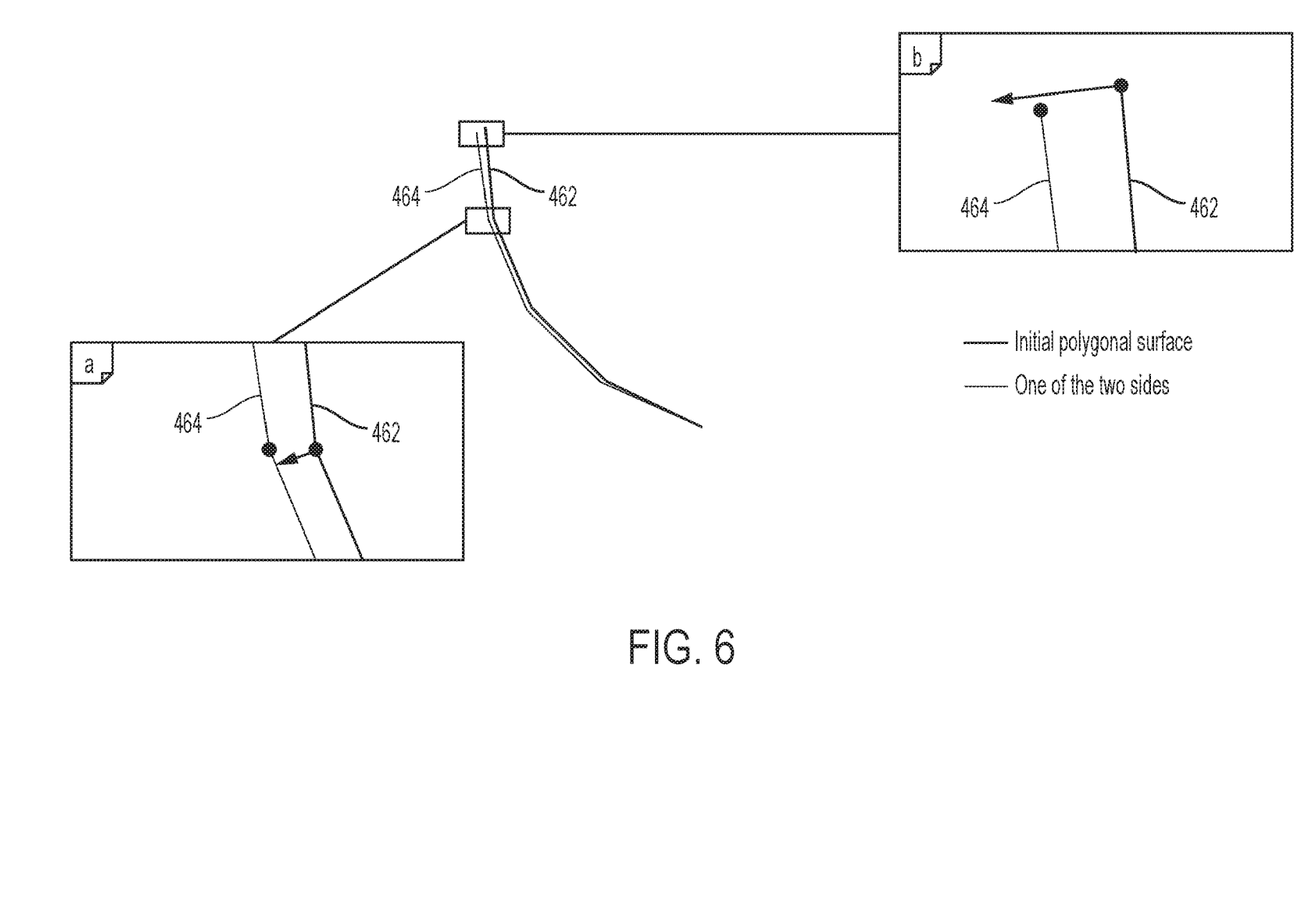
FIG. 6 illustrates an exemplary discontinuity projection.

The nodes of the initial polygonal surface maybe projected onto each of the sides of the discontinuity to retrieve the UVW value at the projected point. The reverse operation, i.e., projecting the nodes of each of the sides onto the original polygonal surface, may also be performed. Referring to FIG. 6, the original polygonal surface 462 and one of the sides of the parameterization 464 may not align after the projection (see, for example, the close up on the right side). If this occurs, the nodes of the initial polygonal surface that have not received a UVW+/− value may be populated via an interpolation, for example, using a least squares approach.

From a single surface with UVW+ and UVW− values defined on all the nodes, the surface may be sequentially divided to generate a diagram of juxtaposition. Steps of this process may include: representing arbitrary polygons, and applying a split operation S(P, Iparam) to an arbitrary polygon P, which produces two or more new polygons split across the isovalue Iparam of a given parameterization property param (where param is U+, V+, W+, U−, V− and/or W−), in such a way that the polygon-to-polygon neighborhood information may be maintained. Neighborhood information may include knowing which edges are connected to which faces. In an example, information about the connection between an edge of one side of the discontinuity (for example, the UVW+ parameterization side) and a face of the other side of the discontinuity (for example, the UVW− parameterization), provides the information needed to determine an MPFA interaction region (discussed more below).

Using this process, a collection C of isovalues Iparam may be gathered along the U, V and W parameterization properties that correspond to cell boundaries of a depositional grid or cut-cell grid. The polygons of the unconformity surface can then be sequentially split along all entries of collection C using the split operator S. This may produce a new polygonal surface whose constitutive polygons can be mapped to the juxtaposition diagram, whose polygons are convex when the initial unconformity surface are also made of convex polygons, as will be true, for example, for triangulated surfaces.

Referring to FIG. 7, an algorithm to divide U and V parameterization properties of a 2D polygon will be described. It will be appreciated the technique may also be used for 3D analysis that would also include a W parameterization property. For simplicity of illustration, the 2D case has been illustrated.

Figure 7A:
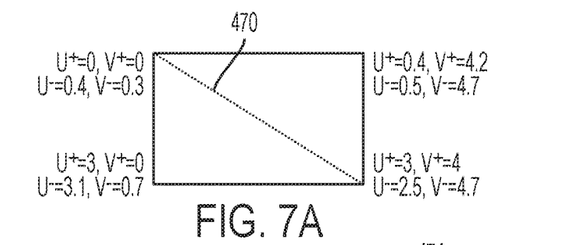
FIG. 7A illustrates a step of an exemplary division of a polygonal surface.
Figure 7B:
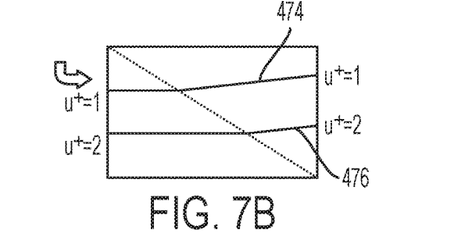
FIG. 7B illustrates a step of an exemplary division of a polygonal surface.
Figure 7C:
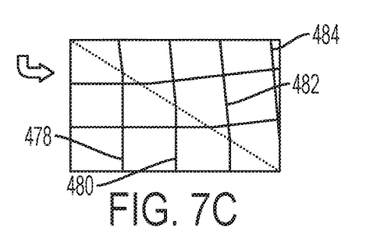
FIG. 7C illustrates a step of an exemplary division of a polygonal surface.
Figure 7D:
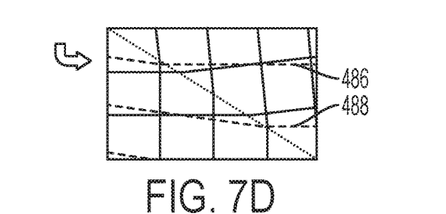
FIG. 7D illustrates a step of an exemplary division of a polygonal surface.
Figure 7E:
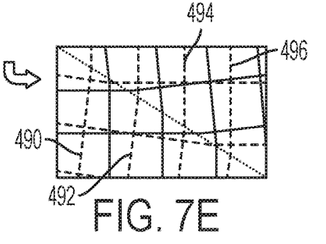
FIG. 7E illustrates a step of an exemplary division of a polygonal surface.

Referring to FIG. 7A, an initial polygonal surface with UV+ and UV− values for each of its nodes are shown. The dotted line 470 illustrates a fold in the polygonal surface, for example as may be the case at the region 472 of FIG. 5. Thus, the initial polygonal surface illustrated includes two triangles. Referring to FIG. 7B, the surface may be divided along the U+ isovalues (where 474 represents U+=1 and 476 represents U+=2). The polygonal surface illustrated now includes six polygons. Referring to FIG. 7C, the surface may be divided along the V+ isovalues (where 478 represents V+=1, 480 represents V+=2, 482 represents V+=3 and 484 represents V+=4). Referring to FIG. 7D (U− isovalues) and 7E (V− isovalues), the surface may be divided on the U− isolines (where 486 represents U−=1 and 488 represents U−=2) and the V− isolines (where 478 represents V+=1, 480 represents V+=2, 482 represents V+=3 and 484 represents V+=4). In FIG. 7, the UV+ isolines are shown in solid lines and the UV− isolines are shown in dashed lines.

Figure 8:
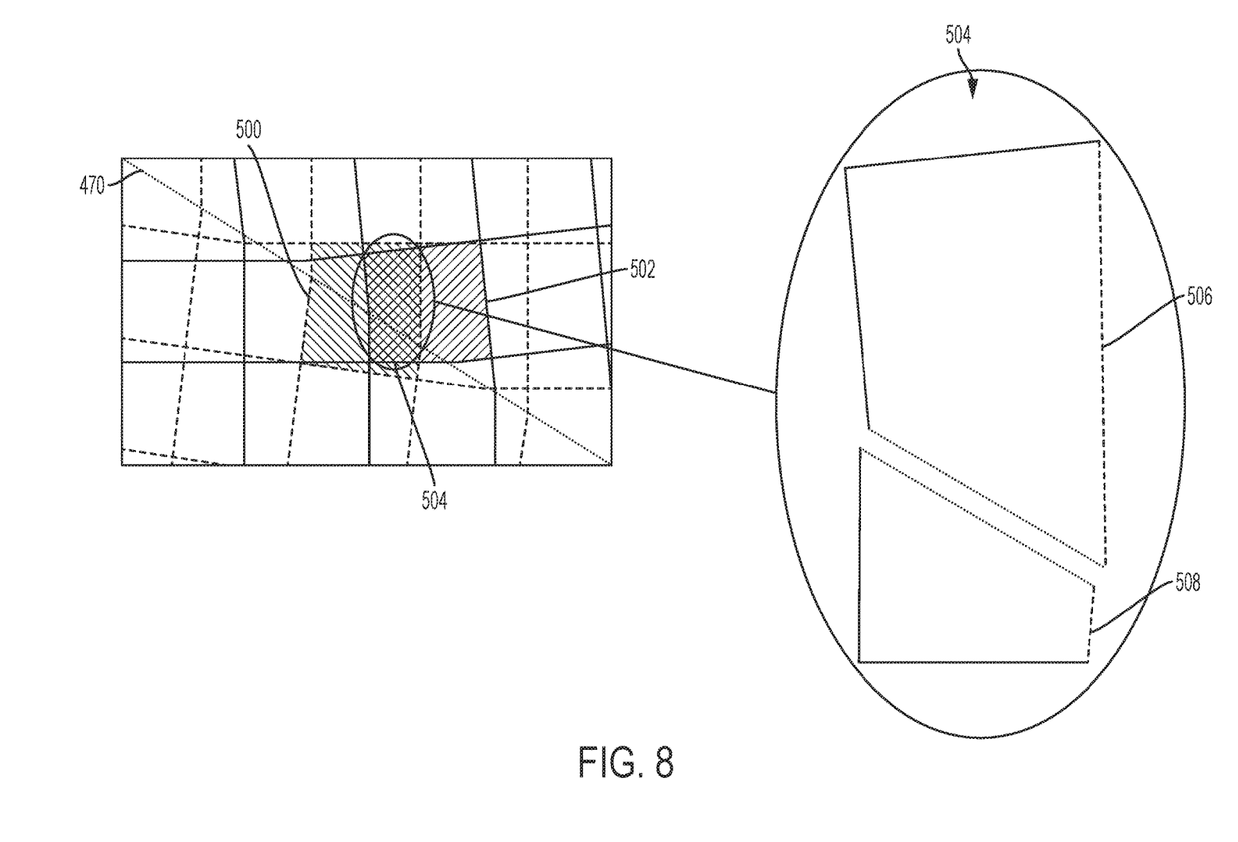
FIG. 8 illustrates an exemplary overlapping area of polygons.

The division of the polygonal surface in FIG. 7 provides a juxtaposition diagram of cells that touch the discontinuity/unconformity on the positive side and the negative side respectively. An area of overlap of similar substrata (e.g., the W parameterization), may then be calculated. There may be more than on polygon attached to a specific cell, for example as shown in FIG. 8, thus, all polygons that attach a subject polygon may be collected. The sum of their individual areas corresponds to a total area of overlap for the non-neighbor connectivity (NNC) cells. This sum may be used in a TPFA or MPFA calculation to model the flow through the discontinuity. In the example of FIG. 8, cell 500 overlaps with cell 502 to provide the overlapping region 504. The overlapping region 504 has two faces 506 and 508 due to the fold 470 in the polygonal surface.

The center of the face(s) between two cells of a NNC (TPFA/MPFA) may also be determined. In a similar fashion to the area computation, all polygons that are attached to this NNC are gathered. For each of these faces, the center of gravity is calculated. The center attached to the NNC can then be computed, e.g., as an area-weighted average of the individual centers of gravity.

The normal of the face(s) between two cells of a NNC (TPFA/MPFA) may also be determined. In a similar fashion, all polygons that are attached to this NNC are gathered. Individual normal vectors, e.g., using Newell's formula, are computed. The normal vector attached to the NNC can then be computed, e.g., as the normalization of an area-weighted average of the individual normal vectors.

Figure 9:
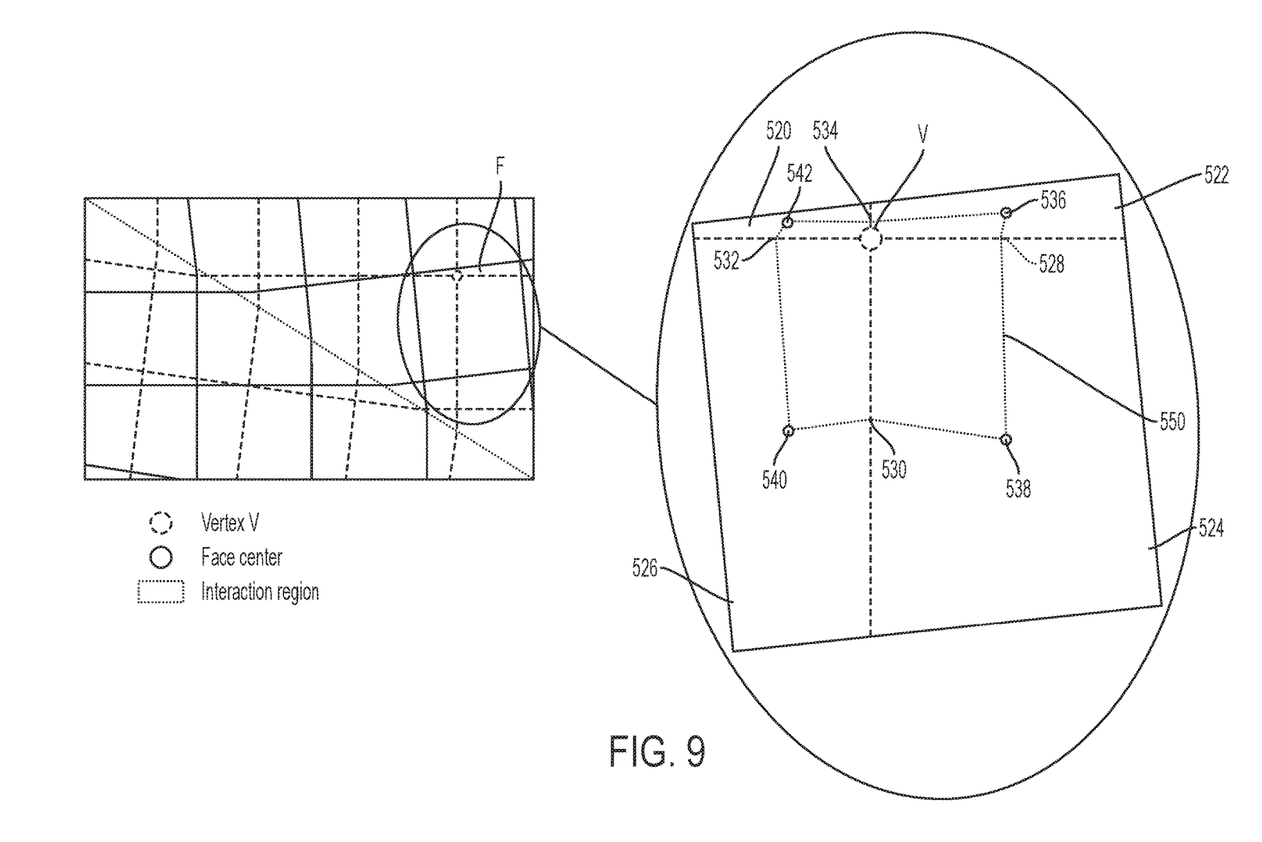
FIG. 9 illustrates an exemplary MPFA interaction region.

An interaction region for the MPFA calculation may also be determined. The interaction region may correspond to a portion of the faces that share a common vertex in the juxtaposition diagram (see, for example, FIG. 9). The interaction region can be determined since the described process may preserve neighborhood information (e.g., the relationship between edges and faces of one side of the discontinuity with edges and faces of the other side of the discontinuity). With reference to FIG. 9, a process for determining the interaction region of vertex V that belongs to face F is described. The set $\{N_{F,V}\}$ of faces that are neighbor to F and incident to V, and that have not been previously visited (faces may be consider to be neighbors if they share an edge) are gathered. In this example, the set of faces includes faces 520, 522, 524 and 526. The centers 528, 530, 532 and 534 of each edge between the faces 520, 522, 524 and 526 are determined. The centers 536, 538, 540 and 542 of each face (for example, using a center of gravity approach) are determined. The centers 528, 530, 532 and 534 and the centers 536, 538, 540 and 542 are connected to define the MPFA interaction region 550. The process may be performed in an iterative process starting with a first face in the set of faces and continued on each of the faces in the set of faces until no new unvisited face incident to V can be found.

The interaction region 550 spans over a cluster of contiguous faces $\{N_{F,V}\}$. This property can be used to assemble the contributions of all faces involved in a MPFA system of equations, thereby resulting in a much more accurate result than a TPFA face-by-face approach. This improves on the issue of TPFA inaccuracy, where the error of transmissibility computation can be arbitrarily large as a function of the non K-orthogonality—indeed there is no clear error bound on TPFA in the presence of such features.

It will be appreciated that the juxtaposition diagram discussed above has applications beyond the improvement on flow simulation accuracy (both TPFA and MPFA). These include the ability to weld a non-welding grid at unconformities, at a lesser computational expense than previously known. It also provides more detailed results for fault analysis than traditional projection-based methods.

Computing Systems

Figure 10:
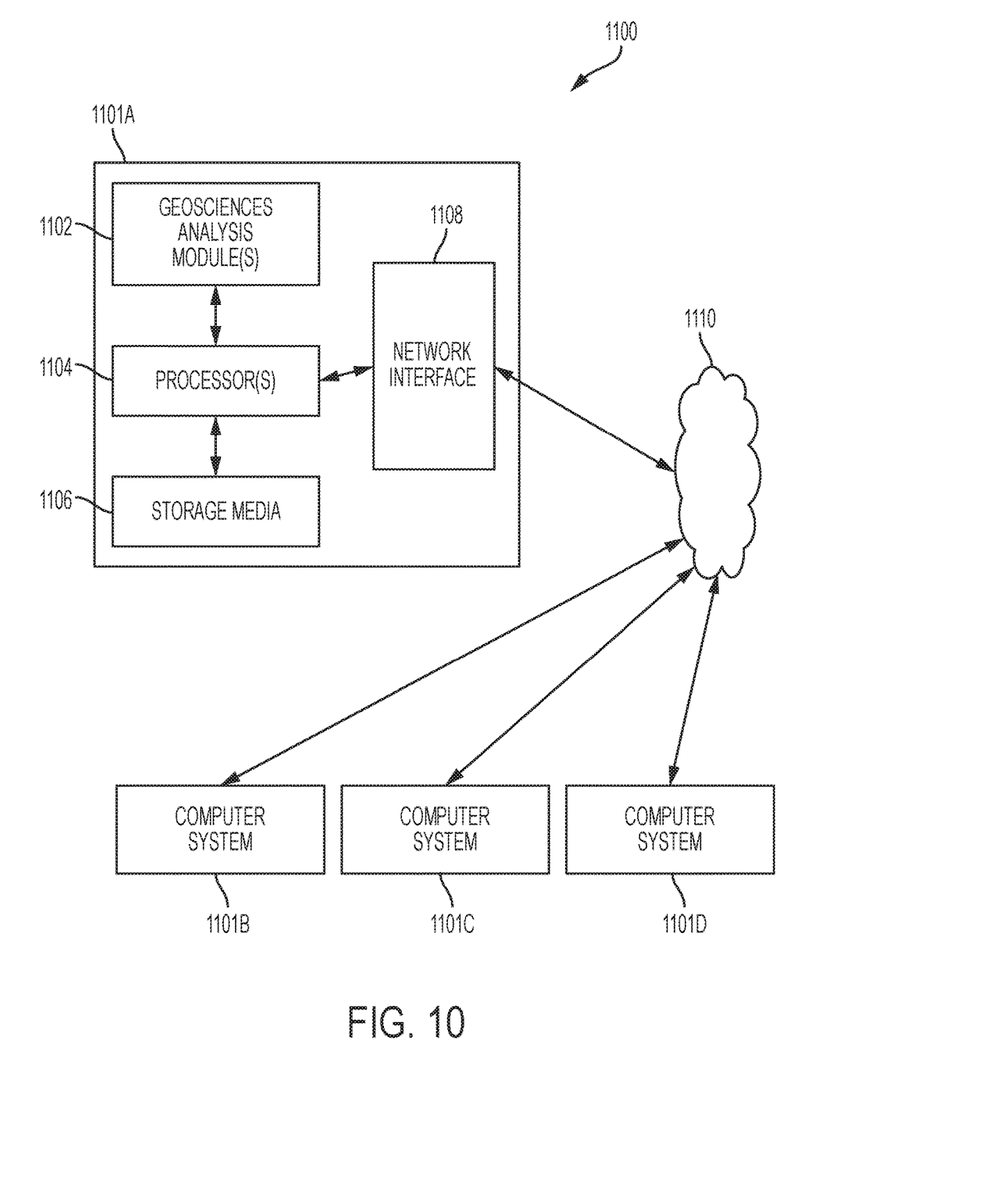
FIG. 10 illustrates an exemplary computing system in accordance with an embodiment.

FIG. 10 depicts an example computing system 1100 in accordance with some embodiments. The computing system 1100 can be an individual computer system 1101A or an arrangement of distributed computer systems. The computer system 1101A includes one or more geosciences analysis modules 1102 that are configured to perform various tasks according to some embodiments, such as one or more methods disclosed herein. To perform these various tasks, geosciences analysis module 1102 executes independently, or in coordination with, one or more processors 1104, which is (or are) connected to one or more storage media 1106A. The processor(s) 1104 is (or are) also connected to a network interface 1108 to allow the computer system 1101A to communicate over a data network 1110 with one or more additional computer systems and/or computing systems, such as 1101B, 1101C, and/or 1101D (note that computer systems 1101B, 1101C and/or 1101D may or may not share the same architecture as computer system 1101A, and may be located in different physical locations, e.g., computer systems 1101A and 1101B may be on a ship underway on the ocean, while in communication with one or more computer systems such as 1101C and/or 1101D that are located in one or more data centers on shore, other ships, and/or located in varying countries on different continents). Note that data network 1110 may be a private network, it may use portions of public networks, it may include remote storage and/or applications processing capabilities (e.g., cloud computing).

A processor can include a microprocessor, microcontroller, processor module or subsystem, programmable integrated circuit, programmable gate array, or another control or computing device.

The storage media 1106A can be implemented as one or more computer-readable or machine-readable storage media. Note that while in the example embodiment of FIG. 10 storage media 1106A is depicted as within computer system 1101A, in some embodiments, storage media 1106A may be distributed within and/or across multiple internal and/or external enclosures of computing system 1101A and/or additional computing systems. Storage media 1106A may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs), BluRays or any other type of optical media; or other types of storage devices. "Non-transitory" computer readable medium refers to the medium itself (i.e., tangible, not a signal) and not data storage persistency (e.g., RAM vs. ROM).

Note that the instructions discussed above can be provided on one computer-readable or machine-readable storage medium, or alternatively, can be provided on multiple computer-readable or machine-readable storage media distributed in a large system having possibly plural nodes and/or non-transitory storage means. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computer system 1101A is one example of a computing system, and that computer system 1101A may have more or fewer components than shown, may combine additional components not depicted in the example embodiment of FIG. 10, and/or computer system 1101A may have a different configuration or arrangement of the components depicted in FIG. 10. The various components shown in FIG. 10 may be implemented in hardware, software, or a combination of both, hardware and software, including one or more signal processing and/or application specific integrated circuits.

It should also be appreciated that while no user input/output peripherals are illustrated with respect to computer systems 1101A, 1101B, 1101C, and 1101D, many embodiments of computing system 1100 include computing systems with keyboards, mice, touch screens, displays, etc. Some computing systems in use in computing system 2100 may be desktop workstations, laptops, tablet computers, smartphones, server computers, etc.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of protection of the disclosure.

Of course, many processing techniques for collected data, including one or more of the techniques and methods disclosed herein, may also be used successfully with collected data types other than seismic data. While certain implementations have been disclosed in the context of seismic data collection and processing, those with skill in the art will recognize that one or more of the methods, techniques, and computing systems disclosed herein can be applied in many fields and contexts where data involving structures arrayed in a multi-dimensional space and/or subsurface region of interest may be collected and processed, e.g., medical imaging techniques such as tomography, ultrasound, MRI and the like for human tissue; radar, sonar, and LIDAR imaging techniques; mining area surveying and monitoring, oceanographic surveying and monitoring, and other appropriate multi-dimensional imaging problems.

Examples of equations and mathematical expressions have been provided in this disclosure. But those with skill in the art will appreciate that variations of these expressions and equations, alternative forms of these expressions and equations, and related expressions and equations that can be derived from the example equations and expressions provided herein may also be successfully used to perform the methods, techniques, and workflows related to the embodiments disclosed herein.

In some embodiments a method is provided in which a seismic data set of a geological survey is provided. A geological discontinuity in the seismic data set is identified. A first parameterization of at least a portion of a first side of the geological discontinuity is identified. A second parameterization of at least a portion of a second side of the geological discontinuity is identified. A plurality of isolines of properties of the first and second parameterizations is determined. A surface of the geological discontinuity is divided according to the isolines. The divided surfaces of the geological discontinuity are mapped.

In some embodiments, a geophysics processor includes: a receiving portion configured to receive a data set of a geological survey; an identification portion configured to: identify a geological discontinuity in the seismic data set, identify a first parameterization of at least a portion of a first side of the geological discontinuity, and identify a second parameterization of at least a portion of a second side of the geological discontinuity; and a processing circuit configured to: determine a plurality of isolines of properties of the first and second parameterizations, divide a surface of the geological discontinuity according to the isolines, and map the divided surfaces of the geological discontinuity.

In some embodiments, a computing system is provided that comprises at least one processor, at least one memory, and one or more programs stored in the at least one memory, wherein the programs comprise instructions, which when executed by the at least one processor, are configured to perform any method disclosed herein.

In some embodiments, a computer readable storage medium is provided, which has stored therein one or more programs, the one or more programs comprising instructions, which when executed by a processor, cause the processor to perform any method disclosed herein.

In some embodiments, a computing system is provided that comprises at least one processor, at least one memory, and one or more programs stored in the at least one memory; and means for performing any method disclosed herein.

In some embodiments, an information processing apparatus for use in a computing system is provided, and that includes means for performing any method disclosed herein.

In some embodiments, a graphics processing unit is provided, and that includes means for performing any method disclosed herein.

These systems, methods, processing procedures, techniques, and workflows increase effectiveness and efficiency. Such systems, methods, processing procedures, techniques, and workflows may complement or replace conventional methods for identifying, isolating, transforming, and/or processing various aspects of data that is collected from a subsurface region or other multi-dimensional space to enhance flow simulation prediction accuracy.

An exemplary benefit of some of the methods and computing systems of the present disclosure is that more effective and accurate methods for determining and/or predicting flow in a reservoir may be employed.

While any discussion of or citation to related art in this disclosure may or may not include some prior art references, applicant neither concedes nor acquiesces to the position that any given reference is prior art or analogous prior art.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to explain the principles of the invention and its practical applications, to thereby enable others skilled in the art to utilize the invention and various embodiments with various modifications as are suited to the particular use contemplated.

What is claimed is:

1. A method for interfacing a geological discontinuity, comprising:
   providing a seismic data set of a geological survey;
   identifying a geological discontinuity in the seismic data set;
   identifying a first parameterization of at least a portion of a first side of the geological discontinuity;
   identifying a second parameterization of at least a portion of a second side of the geological discontinuity;
   determining a plurality of isolines of parameterization properties of the first and second parameterizations;
   dividing a surface of the geological discontinuity according to the isolines;
   mapping the divided surfaces of the geological discontinuity; and
   summing overlapping areas of the divided surfaces to model flow through the discontinuity.

2. The method of claim 1, wherein the discontinuity is associated with at least one of a fault, an erosion, and a base.

3. The method of claim 1, wherein the discontinuity includes a polygonal surface.

4. The method of claim 1, wherein the first side of the geological discontinuity includes a positive side of the geological discontinuity, and the second side of the geological discontinuity includes a negative side of the geological discontinuity.

5. The method of claim 3, wherein the first parametrization includes a $UVW^+$ parameterization, and the second parametrization includes a $UVW^-$ parameterization.

6. The method of claim 5, wherein the mapping the divided surface includes projecting nodes of an initial polygonal surface onto each of the first and second parameterizations.

7. The method of claim 5, wherein the mapping the divided surface includes projecting nodes of each of the first and second parameterizations onto an initial polygonal surface.

8. The method of claim 1, wherein the mapping includes maintaining polygon-to-polygon neighborhood information along the polygonal surface.

9. The method of claim 1, wherein the determining the plurality of isolines includes determining a set of faces.

10. The method of claim 9, wherein the mapping includes mapping the faces onto a juxtaposition diagram.

11. The method of claim 10, wherein the juxtaposition diagram includes a multiple-point flux approximation-compatible diagram of the juxtaposition.

12. A non-transitory computer readable medium having instructions for causing a processor to perform the method of claim 1.

13. A system comprising a processor and memory storing a program having instructions for causing the processor to perform the method of claim 1.

14. A geophysics processor, comprising:
a receiving portion configured to receive a data set of a geological survey;
an identification portion configured to:
- identify a geological discontinuity in the seismic data set,
- identify a first parameterization of at least a portion of a first side of the geological discontinuity, and
- identify a second parameterization of at least a portion of a second side of the geological discontinuity; and a processing circuit configured to:
- determine a plurality of isolines of parameterization properties of the first and second parameterizations,
- divide a surface of the geological discontinuity according to the isolines,
- map the divided surfaces of the geological discontinuity, and
- sum overlapping areas of the divided surfaces to model flow through the discontinuity.

15. The geophysics processor of claim 14, wherein the discontinuity includes a polygonal surface.

16. The geophysics processor of claim 14, wherein the first side of the geological discontinuity includes a positive side of the geological discontinuity, and the second side of the geological discontinuity includes a negative side of the geological discontinuity.

17. The geophysics processor of claim 14, wherein the processing portion is configured to project nodes of an initial polygonal surface onto each of the first and second parameterizations, or project nodes of each of the first and second parameterizations onto an initial polygonal surface.

18. The geophysics processor of claim 14, wherein the processing circuit is configured to maintain polygon-to-polygon neighborhood information across the geological discontinuity.

19. The geophysics processor of claim 14, wherein the identification circuit is configured to determine a set of faces, and to map the faces onto a juxtaposition diagram.

20. The geophysics processor of claim 14, wherein the geophysics processor includes a graphic processing unit that is programmed to provide the receiving portion, the identification portion, and the processing portion.

* * * * *